(12) United States Patent
Du et al.

(10) Patent No.: US 10,572,710 B2
(45) Date of Patent: Feb. 25, 2020

(54) DISPLAY PANEL AND DISPLAY DEVICE

(71) Applicant: BOE TECHNOLOGY GROUP CO., LTD., Beijing (CN)

(72) Inventors: Shuang Du, Beijing (CN); Pao Ming Tsai, Beijing (CN); Dejun Bu, Beijing (CN); Lu Liu, Beijing (CN); Liqiang Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 38 days.

(21) Appl. No.: 15/989,009

(22) Filed: May 24, 2018

(65) Prior Publication Data
US 2019/0163946 A1 May 30, 2019

(30) Foreign Application Priority Data

Nov. 28, 2017 (CN) .......................... 2017 1 1217763

(51) Int. Cl.
G06K 9/00 (2006.01)
G06F 3/044 (2006.01)

(52) U.S. Cl.
CPC ........... *G06K 9/0002* (2013.01); *G06F 3/044* (2013.01); *G06K 9/00087* (2013.01); *G06K 9/00053* (2013.01)

(58) Field of Classification Search
CPC ... G06K 9/0002; G06K 9/00087; G06F 3/044
See application file for complete search history.

(56) References Cited

U.S. PATENT DOCUMENTS

| | | | |
|---|---|---|---|
| 2003/0035972 A1* | 2/2003 | Hanson | B32B 7/02 428/480 |
| 2014/0043850 A1* | 2/2014 | Thompson | G02B 6/0035 362/607 |
| 2015/0015958 A1* | 1/2015 | Kim | G02B 1/11 359/580 |
| 2017/0228072 A1* | 8/2017 | Amin | H01L 41/081 |
| 2017/0300736 A1* | 10/2017 | Song | G06K 9/00033 |
| 2018/0005005 A1* | 1/2018 | He | G06F 3/0412 |
| 2018/0268194 A1* | 9/2018 | Lin | G06K 9/00046 |
| 2019/0087630 A1* | 3/2019 | Seo | G06K 9/0012 |

FOREIGN PATENT DOCUMENTS

| | | |
|---|---|---|
| CN | 104063094 A | 9/2014 |
| CN | 104834892 A | 8/2015 |
| CN | 107182175 A | 9/2017 |
| CN | 207408960 U | 5/2018 |

OTHER PUBLICATIONS

First Chinese Office Action dated Sep. 24, 2019, for corresponding Chinese Application No. 201711217763.1.

* cited by examiner

*Primary Examiner* — Utpal D Shah

(74) *Attorney, Agent, or Firm* — Kinney & Lange, P.A.

(57) ABSTRACT

A display panel and a display device are provided. The display panel includes a display assembly, a transparent cover plate, and a fingerprint recognition module situated between the display assembly and the transparent cover plate. An optical film is arranged at a side of the fingerprint recognition module away from the display assembly. The optical film is configured to indicate a fingerprint recognition region on the display panel. A color of the optical film varies as an observation angle changes.

20 Claims, 11 Drawing Sheets

| |
|---|
| 0.1789H |
| 0.4110L |
| 0.4997H |
| 0.1563L |
| 1.3837H |
| 0.1878L |
| 0.3947H |
| 2.0201L |
| 0.4201H |
| 0.1603L |
| 1.2776H |
| 0.3037L |
| 0.2602H |
| 1.2977L |
| 0.2174H |
| 0.3514L |
| 1.1858H |
| 0.0887L |
| 0.5241H |
| 0.9624L |

Fig. 3

DISPLAY PANEL AND DISPLAY DEVICE

CROSS-REFERENCE TO RELATED APPLICATION

This application claims the priority benefit of the Chinese Patent Application No. 201711217763.1 filed on Nov. 28, 2017 in the State Intellectual Property Office of China, the whole disclosure of which is incorporated herein by reference.

BACKGROUND

The present disclosure relates generally to fingerprint recognition technology, and more particularly to a display panel having fingerprint recognition function and a display device having fingerprint recognition function.

A person's fingerprint is unique and constant. Fingerprints can be used to distinguish one person from others. The fingerprint is composed of a series of ridges and valleys on a surface of skin at a tip of a finger. These ridges and valleys have components that typically include details such as forks of ridges, ends of ridges, arches, tentedarches, left loops, right loops, whorls or twin loops. These components determine uniqueness of a pattern of the fingerprint. As display technology develops rapidly, display panels having fingerprint recognition capabilities have been gradually introduced more widely in the people's lives.

At present, concealed fingerprint recognition technology is one of the more popular fingerprint recognition technologies. In concealed fingerprint recognition technology, a part of a region below a transparent cover plate of the display panel is placed against a fingerprint recognition module. This display panel typically indicates a user fingerprint recognition region in a corresponding position of visual region by software design when the screen is lit, for the convenience of users.

SUMMARY

An embodiment of the present disclosure provides a display panel, comprising: a display assembly; a transparent cover plate; and a fingerprint recognition module between the display assembly and the transparent cover plate, wherein an optical film is arranged at a side of the fingerprint recognition module away from the display assembly, and the optical film is configured to indicate a fingerprint recognition region on the display panel, and a color of the optical film varies as an observation angle changes.

In some embodiments, the optical film is configured to show a certain color for the observation angle greater than a predetermined critical angle and become colorless and transparent for the observation angle less than or equal to the predetermined critical angle, and wherein the observation angle is an angle between line of sight and normal of a surface of the optical film.

In some embodiments, the predetermined critical angle is in a range between 30 degrees and 60 degrees.

In some embodiments, the optical film is configured to exhibit yellow-green at the observation angle greater than the predetermined critical angle.

In some embodiments, the optical film is in the fingerprint recognition region.

In some embodiments, the optical film is arranged around the fingerprint recognition region.

In some embodiments, the optical film is aligned with the fingerprint recognition module.

In some embodiments, the fingerprint recognition region is overlapped at least partly with a display region of the display panel.

In some embodiments, the optical film is arranged between the fingerprint recognition module and the transparent cover plate.

In some embodiments, the optical film is arranged at a side of the transparent cover plate away from the fingerprint recognition module.

In some embodiments, the display panel further comprises a protection layer at a side of the transparent cover plate away from the fingerprint recognition module; and the optical film is arranged between the fingerprint recognition module and the protection layer.

In some embodiments, the fingerprint recognition module comprises a capacitor type fingerprint recognition sensor.

In some embodiments, the display panel further comprises a semiconductor film between the transparent cover plate and the protection layer, wherein semiconductor stripes spaced apart from each other are formed on the semiconductor film.

In some embodiments, the optical film is between the transparent cover plate and the semiconductor film.

In some embodiments, the optical film is between the protection layer and the semiconductor film.

In some embodiments, the optical film is an optically variable film.

In some embodiments, the optically variable film comprises at least one layer of high refractivity film and at least one layer of low refractivity film arranged alternately.

In some embodiments, the display panel further comprises: a touch screen between the fingerprint recognition module and the display assembly.

In some embodiments, the display panel is a frameless display panel.

An embodiment of the present disclosure also provides a display device comprising: the display panel as describe above.

BRIEF DESCRIPTION OF THE DRAWINGS

FIG. 3 is a schematic view showing an exemplified structure of an optically variable film in the display panel according to an embodiment of the present disclosure.

DETAILED DESCRIPTION

Embodiments of the present disclosure provide a display panel having fingerprint recognition capabilities, and a display device having fingerprint recognition functions configured to recognize positions of the fingerprint recognition region with lighting to improve user's experiences.

Technical solutions in embodiments of the present disclosure will be described clearly and entirely below with reference to drawings for the embodiments of the present disclosure. Apparently, the described embodiments are only part of embodiments of the present disclosure, instead of all of embodiments. All of other embodiments that can be obtained by a skilled person in the art without any creative efforts from the embodiments of the present disclosure belong to the protection scope of the present disclosure.

It should be noted that thickness and shapes of various layers in drawings of the present disclosure do not reflect real scales, but only are intended to explain the present disclosure.

Figure 1:
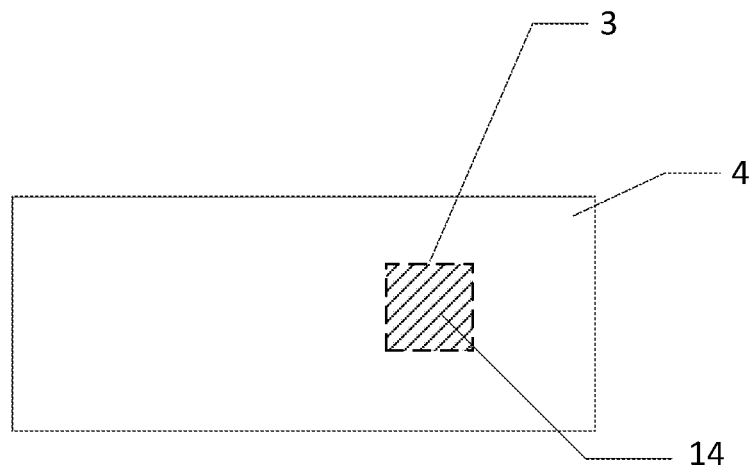
FIG. 1 is a schematic top view showing a structure of a display panel in an embodiment of the present disclosure.
Figure 2:
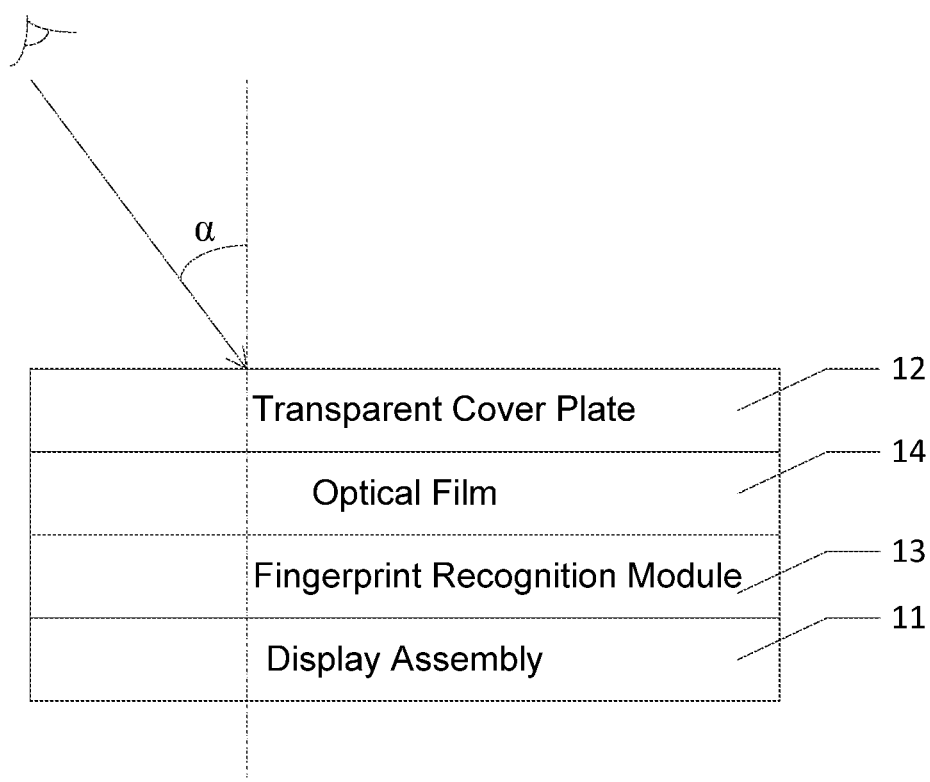
FIG. 2 is a schematic partial cross sectional view showing a structure of the display panel according to an embodiment of the present disclosure.
Figure 13:
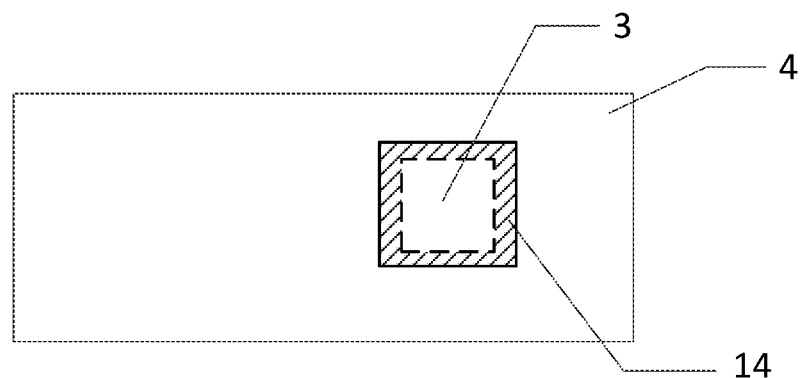
FIG. 13 and FIG. 14 show examples of positions and shapes of the optical film on the display panel according to an embodiment of the present disclosure.
Figure 14:
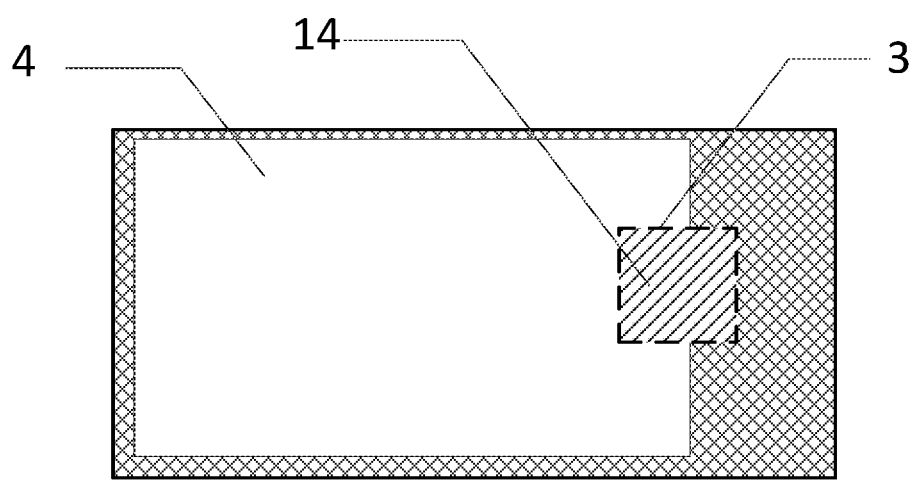

FIG. 1 and FIG. 2 show a display panel according to an embodiment of the present disclosure. The display panel includes: a display assembly 11; a transparent cover plate 12; a fingerprint recognition module 13 between the display assembly 11 and the transparent cover plate 12; and an optical film 14 between the fingerprint recognition module 13 and the transparent cover plate 12. Optical film 14 may be configured to indicate a fingerprint recognition region 3 (see the region denoted by the dashed line in FIG. 1) on the display panel. In the example shown in FIG. 1, the display panel is a frameless panel, that is, an entire region of the display panel can almost be regarded as a display region 4. FIG. 2 shows a partial cross sectional view of the display panel in fingerprint recognition region 3. When a fingerprint is detected, the portion of a finger or toe having the fingerprint to be detected is required to be placed in fingerprint recognition region 3, so as to recognize the fingerprint effectively. As an example, fingerprint recognition module 13 may be located in fingerprint recognition region 3. However, embodiments of the present disclosure are not limited to this. For example, fingerprint recognition module 13 may alternatively be displaced with respect to fingerprint recognition region 3 to some extent. As an example, fingerprint recognition region 3 may be overlapped at least partly with display region 4 of the display panel (shown in FIG. 14), for example fingerprint recognition region 3 may fall fully within display region 4 of the display panel. It may reduce the area which is occupied by fingerprint recognition region 3 separately and increase the area of display region 4. FIG. 14 shows the display panel with a frame, while FIGS. 1 and 13 both show frameless display panels.

A color of optical film 14 may vary as the observation angle α varies. For example, optical film 14 may be configured to show a certain color for observation angle α greater than a predetermined critical angle and become colorless and transparent for observation angle α less than or equal to the predetermined critical angle. Observation angle α is an angle between line of sight and normal of a surface of the optical film 14, as shown in FIG. 2. In this way, it is particularly beneficial if fingerprint recognition region 3 is arranged in display region 4 of the display panel. When the user observes the display panel at a relatively small observation angle, optical film 14 is colorless and transparent, and therefore only minimally disturbs the image display in display region 4. When the user needs to perform fingerprint recognition, as long as the observation angle increases, variation of the color of optical film 14 will be observed, so as to determine the position of fingerprint recognition region 3. However, the embodiments of the present disclosure are not limited to this. For example, optical film 14 may alternatively be configured to show a certain color for observation angle α greater than a predetermined critical angle, and to show another different color for observation angle α less than or equal to the predetermined critical angle.

The predetermined critical angle means the observation angle at which a preset optical film 14 just produces variation of color (for example show a certain color). The predetermined critical angle may be provided depending on optical film theory by means of optical film system design software as required. As an example, the predetermined critical angle may be in a range between 30° and 60°. The predetermined critical angle may, for example, be 40° or 60°.

In order to indicate fingerprint recognition region 3 on the display panel, as an example, optical film 14 may be in fingerprint recognition region 3. For example, optical film 14 may have a size less than area of fingerprint recognition region 3, or the size of optical film 14 may be comparable to the area of fingerprint recognition region 3 or slightly greater than the area of fingerprint recognition region 3. In the example shown in FIG. 1, the size of optical film 14 (see hatched portion) coincides with fingerprint recognition region 3 completely. Thus, when the user observes the display panel at different observation angles, optical film 14 may indicate the position of fingerprint recognition region 3 clearly. As an example, optical film 14 may be aligned with fingerprint recognition module 13. As an alternative example, optical film 14 may also be arranged around fingerprint recognition region 3, as shown in FIG. 13. It may also indicate the position of fingerprint recognition region 3. It is helpful to displace optical film 14 from fingerprint recognition module 13, so as to avoid disturbing the detection of fingerprint recognition module 13.

In an example, transparent cover plate 12 may be a flexible cover plate, for example an ultrathin glass.

For example, fingerprint recognition module 13 may include a fingerprint recognition sensor. The fingerprint recognition sensor may be of press contact type or swipe type. The type of the fingerprint recognition module is not limited in the embodiments of the present disclosure, for example, fingerprint recognition module 13 may be a capacitor type fingerprint recognition module, an optical fingerprint recognition module or an ultrasonic fingerprint recognition module, or the like. Typically, fingerprint recognition module 13 is arranged at a portion of the region below transparent cover plate 12.

In one embodiment, optical film 14 may be an optically variable film. In other embodiments, optical film 14 can alternatively be a film of another kind. The embodiments of the present disclosure are not limited in this regard.

In one embodiment, the optically variable film includes at least one layer of high refractivity film and at least one layer of low refractivity film arranged alternatingly.

For example, the high refractivity film may be made from $TiO_2$. For example, the low refractivity film may be made from $SiO_2$.

In one embodiment, optical film 14 has the structure as shown in FIG. 3. In FIG. 3, starting from the side of optical film 14 facing towards transparent cover plate 12, optical film 14 has a film system represented by the following form: 0.1789H, 0.4110L, 0.4997H, 0.1563L, 1.3837H, 0.1878L, 0.3947H, 2.0201L, 0.4201H, 0.1603L, 1.2776H, 0.3037L, 0.2602H, 1.2977L, 0.2174H, 0.3514L, 1.1858H, 0.0887L, 0.5241H, 0.9624L, where the numeral represents a coefficient of optical thickness corresponding to one quarter of a reference wavelength (the reference wavelength is 550 nm), H represents the optical thickness of the material of the high refractivity corresponding to one quarter of the reference wavelength, L represents the optical thickness of the material of the low refractivity corresponding to one quarter of the reference wavelength. For example, "aH" represents the optical thickness of the material of the high refractivity is a* one quarter of the reference wavelength. In other embodiments, the film system of the optical film 14 can also be represented by other forms.

Optical film 14 may for example be produced by processes such as sputtering, coating or evaporation.

As an example, when optical film 14 is lighted, if the display panel is observed head-on or at small observation angle (i.e., the observation angle is not greater than the predetermined critical angle), optical film 14 will become colorless and transparent; and if the observation angle is greater than the predetermined critical angle, optical film 14 will show a certain color and the color of optical film 14 may vary as the observation angle changes.

Figure 4:
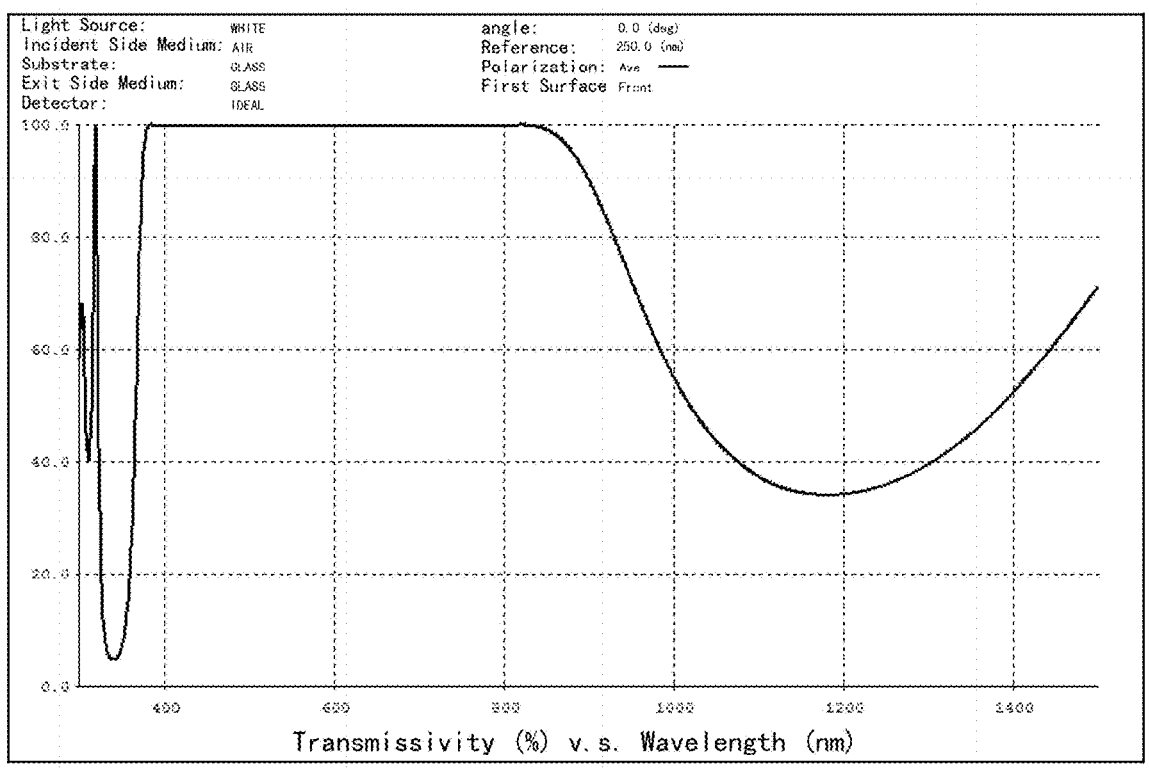
FIG. 4 is a spectrum diagram of the optically variable film in the display panel according to an embodiment of the present disclosure when an observation angle is zero degrees.
Figure 5:
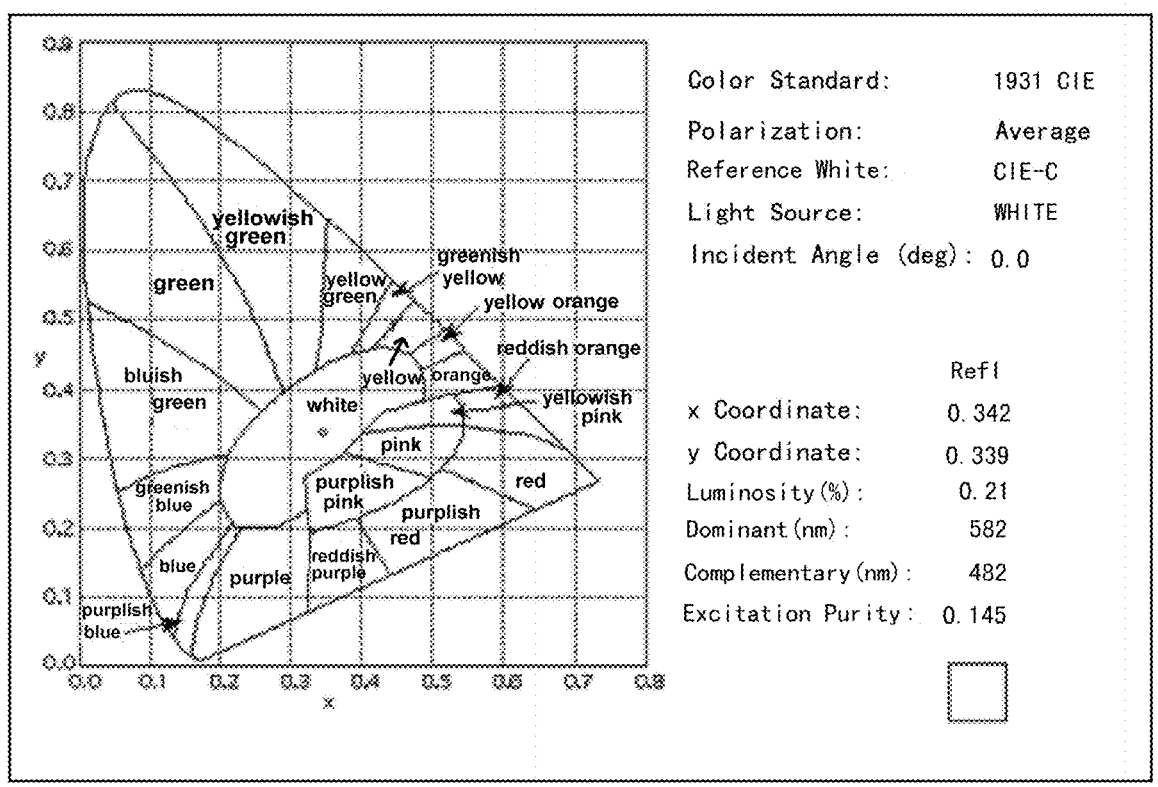
FIG. 5 is a chromaticity diagram of the optically variable film in the display panel according to an embodiment of the present disclosure when an observation angle is zero degrees.
Figure 6:
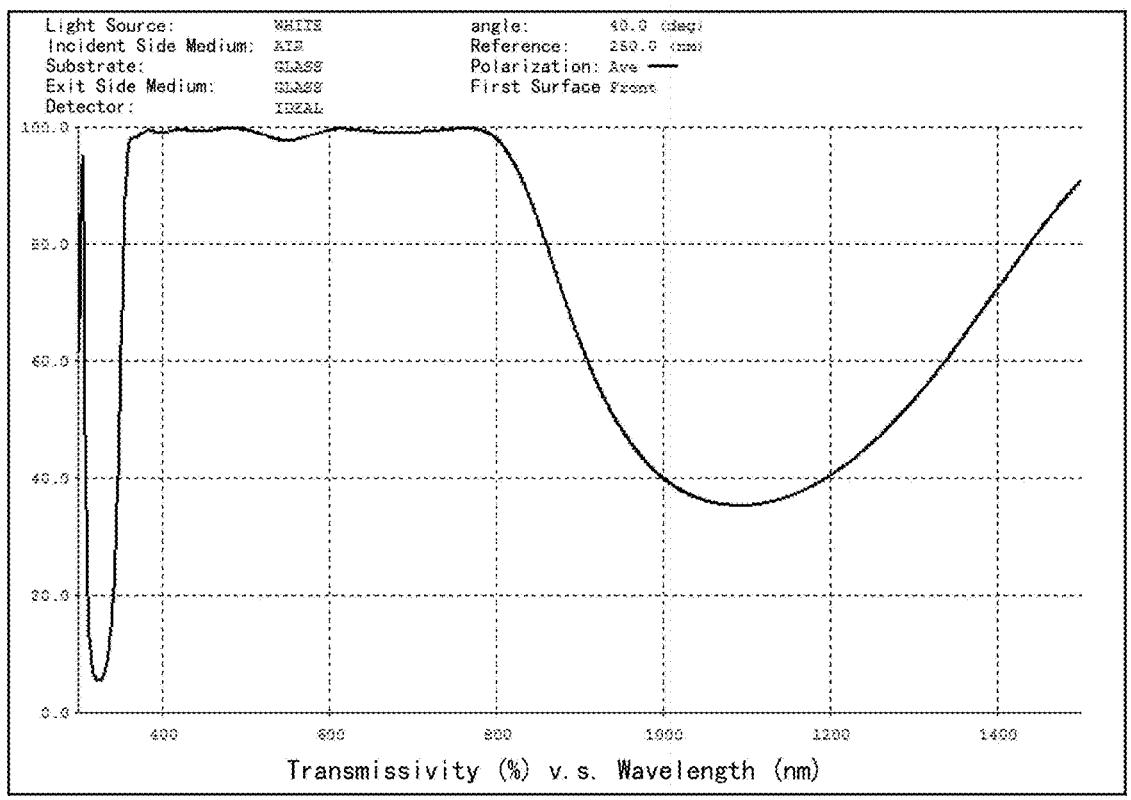
FIG. 6 is a spectrum diagram of the optically variable film in the display panel according to an embodiment of the present disclosure when an observation angle is 40 degrees.
Figure 7:
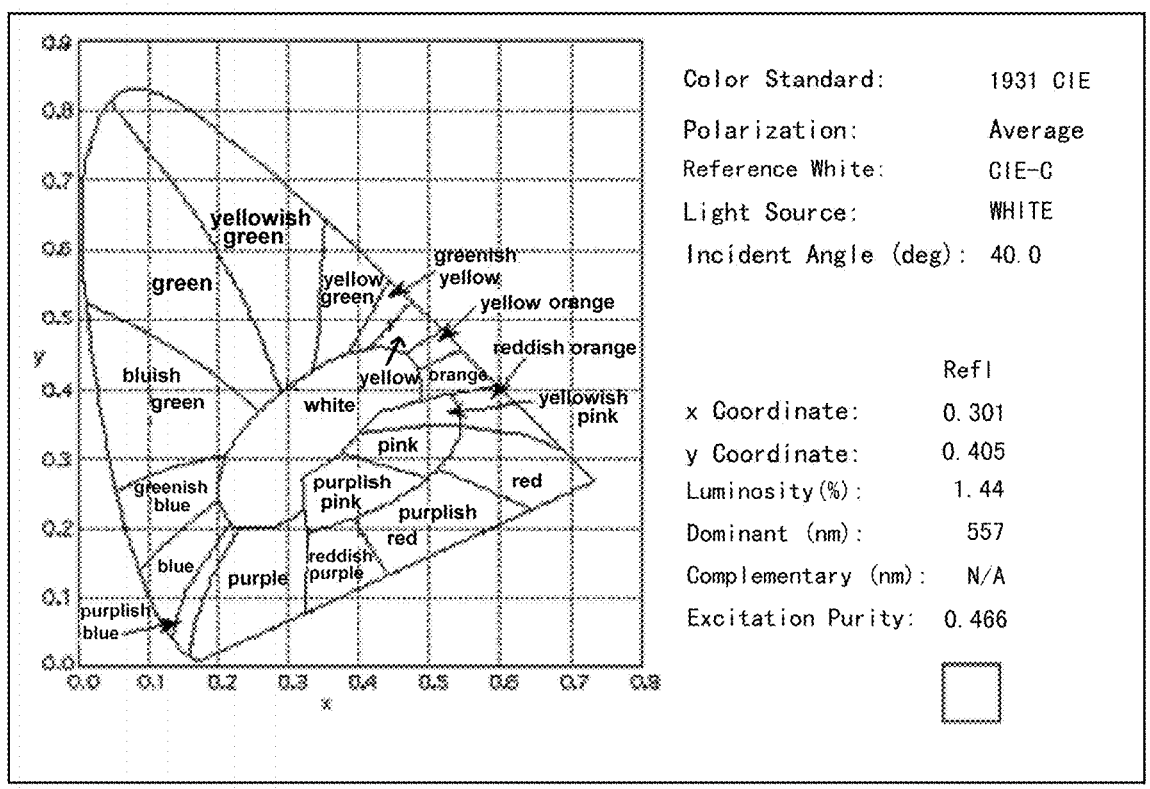
FIG. 7 is a chromaticity diagram of the optically variable film in the display panel according to an embodiment of the present disclosure when an observation angle is 40 degrees.
Figure 8:
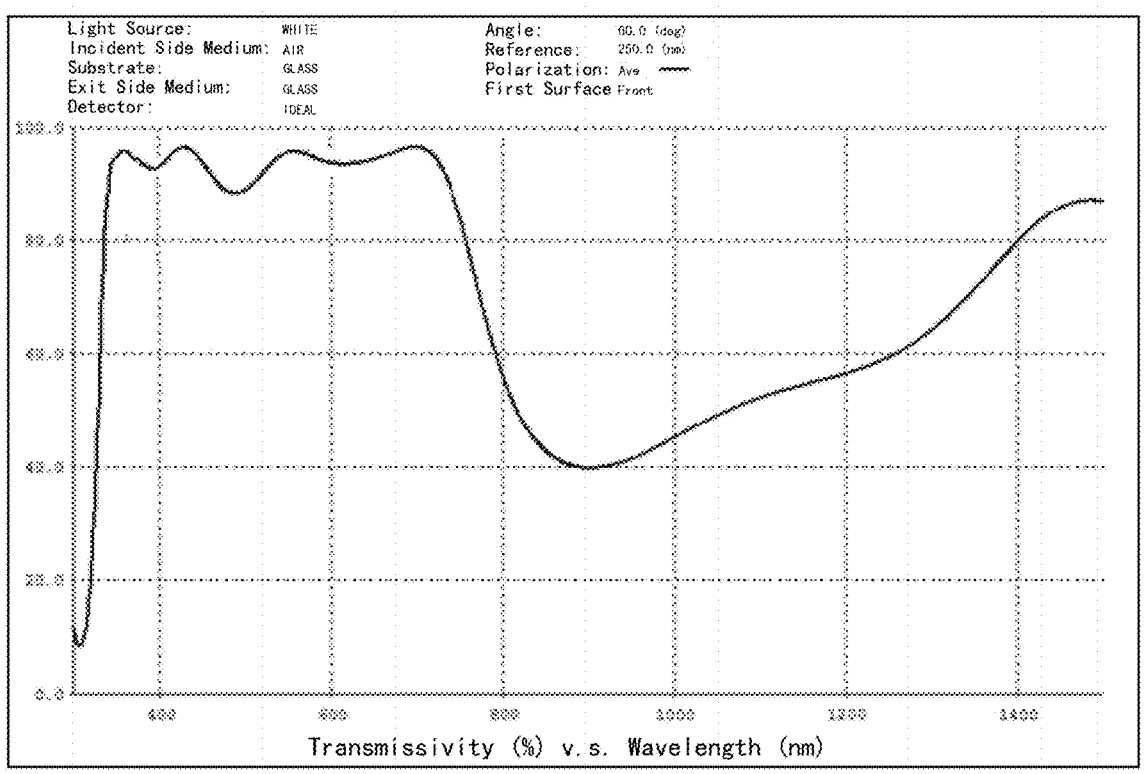
FIG. 8 is a spectrum diagram of the optically variable film in the display panel according to an embodiment of the present disclosure when an observation angle is 60 degrees.
Figure 9:
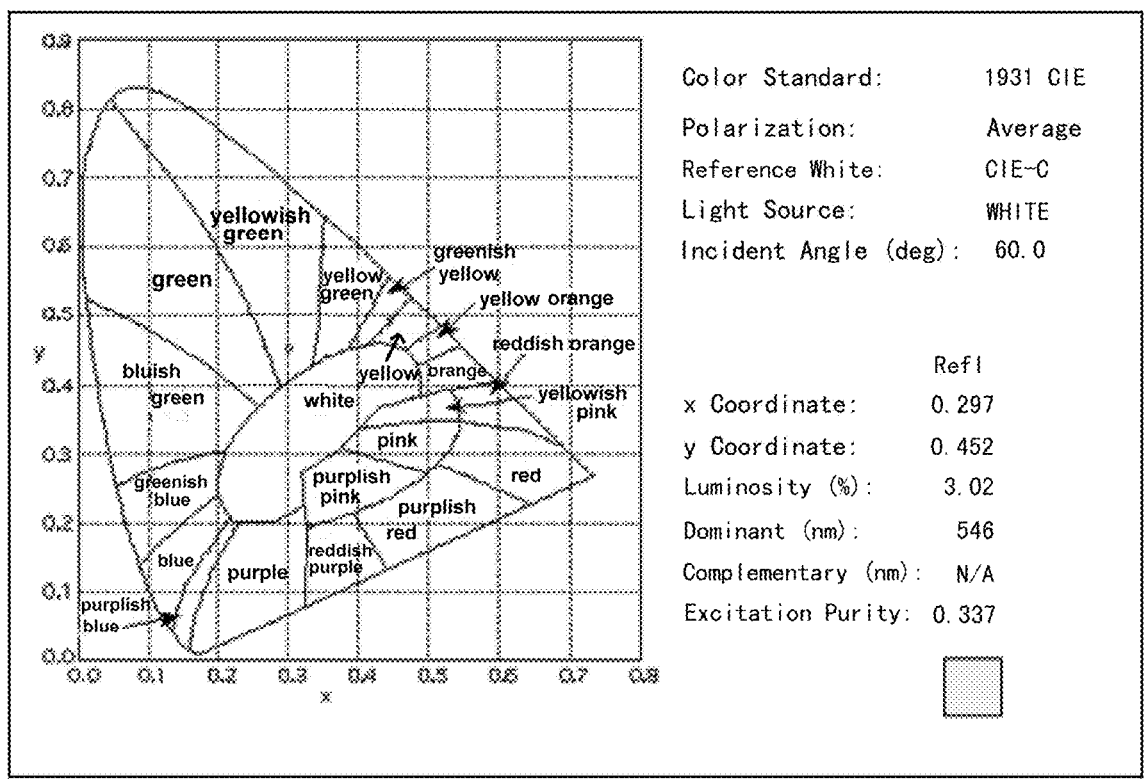
FIG. 9 is a chromaticity diagram of the optically variable film in the display panel according to an embodiment of the present disclosure when an observation angle is 60 degrees.

In an embodiment, the predetermined critical angle may be 40°. That is, when optical film 14 is lighted, if the observation angle of the display panel is not greater than 40°, optical film 14 will become colorless and transparent. For example, when the display panel is observed straightly (i.e., the observation angle is 0°), optical film 14 is colorless and transparent. Optical film 14 is a high transmittance film in the visible light waveband while optical film 14 is a high reflectivity film in the near infrared light waveband. FIG. 4 shows its spectra diagram. FIG. 5 shows its chromaticity diagram. If the observation angle of the display panel is the predetermined critical angle of 40°, optical film 14 is still colorless and transparent. FIG. 6 shows its spectra diagram. FIG. 7 shows its chromaticity diagram. If the observation angle is greater than 40°, optical film 14 shows a certain color. For example, if the observation angle is 60°, the high reflectivity region moves to the visible light waveband and the optical film 14 exhibits yellow-green. FIG. 8 shows its spectra diagram. FIG. 9 shows its chromaticity diagram. In this way, whether the screen turns on or turns off, the position of fingerprint recognition region 3 can be indicated, for convenience of the user, to improve the user's experiences.

It should be noted that in case that optical film 14 is an optically variable film, the size of the predetermined critical angle is inversely proportional to the thickness of the optically variable film. The smaller the predetermined critical angle is, the larger the thickness of the optically variable film is.

Figure 10:
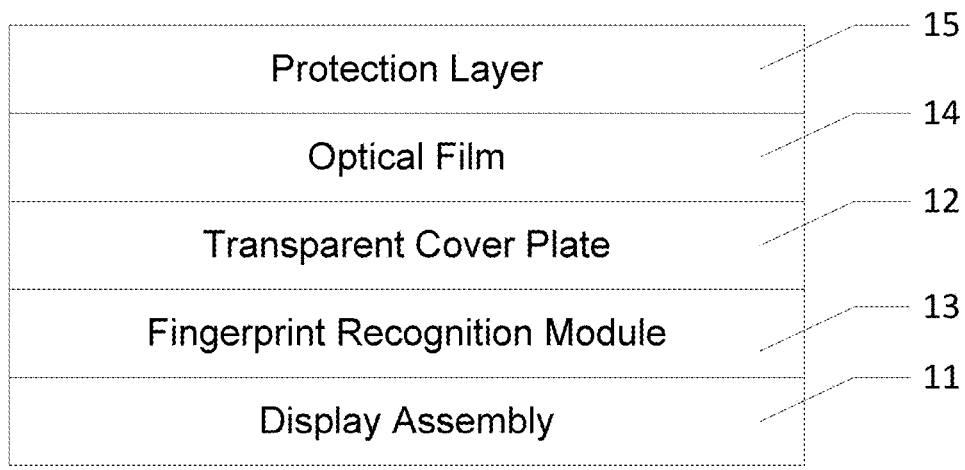
FIG. 10 is a schematic view showing a structure of a display panel according to another embodiment of the present disclosure.

FIG. 10 shows a display panel according to another embodiment of the present disclosure. The same part of the display panel as the display panel provided by the previous embodiment will be omitted. And different parts of the display panel from the display panel provided by the previous embodiment will be explained below.

As shown in FIG. 10, the display panel further includes a protection layer 15 arranged at a side of transparent cover plate 12 away from fingerprint recognition module 13; and optical film 14 is arranged between fingerprint recognition module 13 and protection layer 15. As an example, protection layer 15 may be arranged at the most outer side of the display panel.

For example, optical film 14 is arranged between transparent cover plate 12 and protection layer 15, as shown in FIG. 10. Optical film 14 may alternatively be arranged between fingerprint recognition module 13 and transparent cover plate 12. The embodiments of the present disclosure are not limited in this respect. A skilled person in the art should understand that optical film 14 only needs to be arranged at the side of fingerprint recognition module 13 away from display assembly 11.

The above protection layer 15 may for example be formed by spraying technology or thermal evaporation technology. The protection layer is made from AF film, also called as anti-fingerprint film. The anti-fingerprint film is a fluoroalkyl silane long-chain compound. As the anti-fingerprint film has relatively low surface tension, it has good water resistance, oil resistance and decontamination. It also has wear resistance and thus has protection function.

Figure 11:
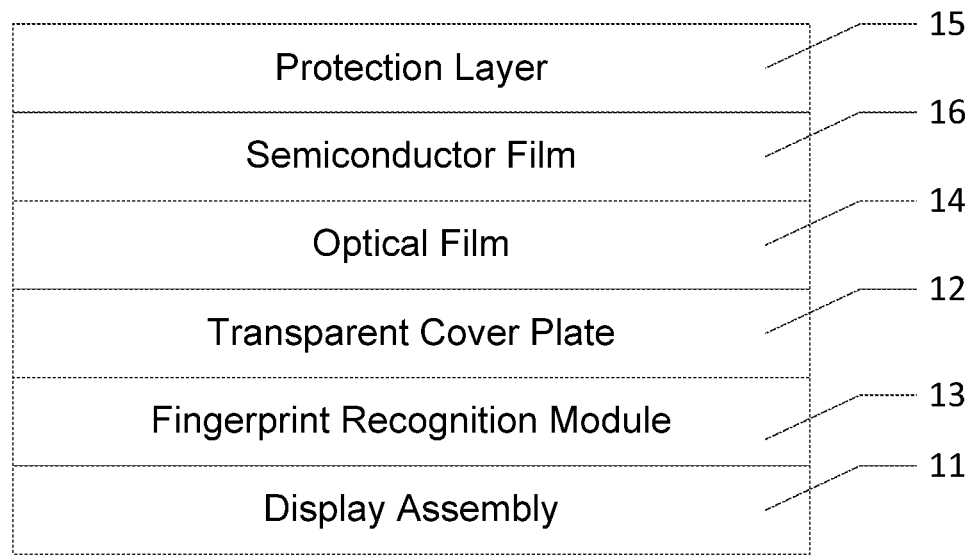
FIG. 11 is a schematic view showing a structure of a display panel according to a further embodiment of the present disclosure.

FIG. 11 shows a display panel according to a further embodiment of the present disclosure. The same part of the display panel as the display panel provided by the previous embodiment will be omitted. And different parts of the display panel from the display panel provided by the previous embodiment will be explained below.

As shown in FIG. 11, the display panel further includes: a semiconductor film 16 between transparent cover plate 12 and protection layer 15. Stripes 161 are spaced apart from each other, and are formed on semiconductor film 16. Optical film 14 is located between transparent cover plate 12 and semiconductor film 16. It is particularly beneficial if fingerprint recognition module 13 is a capacitor type fingerprint recognition sensor.

For example, semiconductor film 16 may be produced by a vacuum deposition method. Semiconductor film 16 can for example be made from semiconductor polymer, indium tin oxide, or zinc tin oxide.

The stripes may be arranged on an entirety of semiconductor film 16 or local part of semiconductor film 16. The stripes are formed by technology such as lithography to be spaced apart from each other, so as to prevent stripes 161 from being interconnected with each other when they are charged by coupling. From the semiconductor property of the material, if semiconductor film 16 is not charged by coupling, semiconductor film 16 will function primarily as an electrical insulator, so as to avoid affecting other operations of the fingers on the display panel. If the semiconductor layer is charged by applying RF (radio frequency) high voltage to it, it will function primarily as a conductor, so that tiny RF current signal may be inputted to the finger by charging semiconductor film 16 by coupling.

Figure 15:
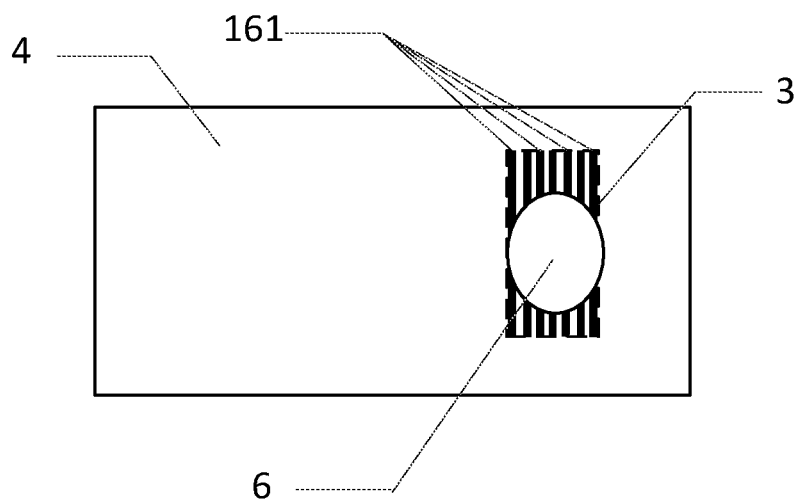
FIG. 15 shows an example of a semiconductor film in the display panel according to an embodiment of the present disclosure.

A local part of semiconductor film 16 is processed by lithography to form stripes 161 spaced apart from each other (as shown in FIG. 15). On one hand, it is intended to avoid conducting the entirety of semiconductor film 16 when semiconductor film 16 is charged by coupling; on the other hand, it can be used to charge a local portion of finger 6, and other portions of the finger corresponding to the fingerprint recognition sensor below semiconductor film 16 may be used for the fingerprint recognition.

Figure 12:
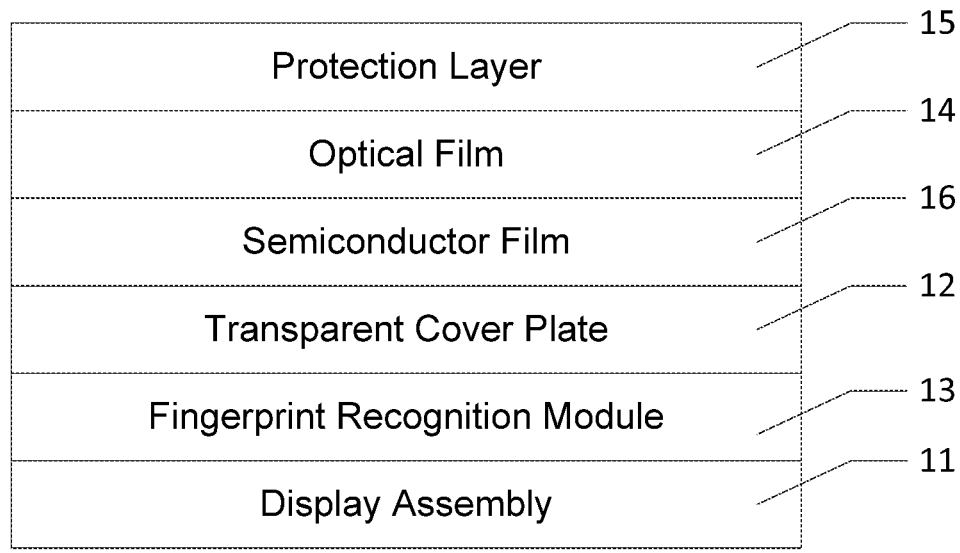
FIG. 12 is a schematic view showing a structure of a display panel according to a yet further embodiment of the present disclosure.

FIG. 12 shows a display panel according to a yet further embodiment of the present disclosure. The same part of the display panel as the display panel provided by the previous embodiment will be omitted. And different parts of the display panel from the display panel provided by the previous embodiment will be explained below.

As shown in FIG. 12, in the display panel, the optical film 14 is between the protection layer 15 and the semiconductor film 16.

It should be noted that when the semiconductor film is arranged in the display panel, the protection layer may not be arranged in the display panel; in contrast, when the semiconductor film is arranged in the display panel, optical film 14 may also be arranged between fingerprint recognition module 13 and transparent cover plate 12. The embodiments of the present disclosure are not limited to this.

Figure 16:
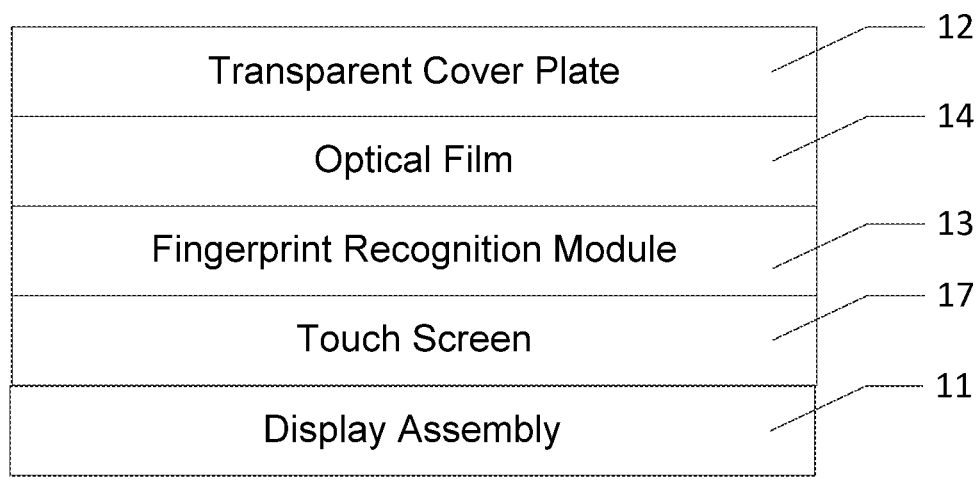
FIG. 16 is a schematic view showing a structure of the display panel according to another embodiment of the present disclosure.

As an example, the display panel according to an embodiment of the present disclosure may further include a touch screen 17. As shown in FIG. 16, touch screen 17 may be between fingerprint recognition module 13 and display assembly 11. However, the embodiments of the present disclosure are not limited in this regard. For example, display assembly 11 may include a display screen such as a liquid crystal display screen or an organic electroluminescent display screen. For example, display assembly 11 may include a flexible display screen. As an example, touch screen 17 may be connected to fingerprint recognition module 13 and display assembly 11 by adhesives.

In an embodiment of the present disclosure, the display panel may be a frameless display panel. Fingerprint recognition region 3 may fully fall within display region 4. However, the embodiments of the present disclosure are not limited in this regard. For example, the display panel may alternatively be a display panel with a frame.

As an example, an embodiment of the present disclosure also provides a display device including: the display panel as provided by any one of the above embodiments of the present disclosure. The display device may include: any products or components having the fingerprint recognition function and the display function, such as a cell phone, a tablet computer, a TV, a display, a notebook computer, a digital photo frame, a navigator or the like.

In summary, in the technical solutions of the embodiments of the present disclosure, in the display panel, the optical film 14 is arranged at a side of the fingerprint recognition module 13 away from the display assembly 11 and is configured to indicate a fingerprint recognition region 3 on the display panel. And the optical film 14 changes color (for example shows a certain color) when the observation angle is greater than the predetermined critical angle. Whether the screen is lit or unlit, the position of the fingerprint recognition region 3 can be indicated by the position of the optical film 14, to improve the user's experiences.

Apparently, the skilled person in the art can make various modifications and variations to the present disclosure without departing from the spirit and scope of the present disclosure. Thus, if these modifications and variations of the present disclosure fall within the scope of claims and the equivalents thereof of the present disclosure, the present disclosure will be also intended to include these modifications and variations.

The invention claimed is:

1. A display panel comprising:
   a display assembly;
   a transparent cover plate; and
   a fingerprint recognition module situated between the display assembly and the transparent cover plate,
   wherein an optical film is arranged at a side of the fingerprint recognition module away from the display assembly, and the optical film is configured to indicate a fingerprint recognition region on the display panel, and a color of the optical film varies as an observation angle changes.

2. The display panel according to claim 1, wherein the optical film is configured to show a certain color for the observation angle greater than a predetermined critical angle and become colorless and transparent for the observation angle less than or equal to the predetermined critical angle, and wherein the observation angle is an angle between line of sight and normal of a surface of the optical film.

3. The display panel according to claim 2, wherein the predetermined critical angle is in a range between 30 degrees and 60 degrees.

4. The display panel according to claim 2, wherein the optical film is configured to exhibit yellow-green at the observation angle greater than the predetermined critical angle.

5. The display panel according to claim 1, wherein the optical film is in the fingerprint recognition region.

6. The display panel according to claim 1, wherein the optical film is arranged around the fingerprint recognition region.

7. The display panel according to claim 1, wherein the optical film is aligned with the fingerprint recognition module.

8. The display panel according to claim 1, wherein the fingerprint recognition region is overlapped at least partly with a display region of the display panel.

9. The display panel according to claim 1, wherein the optical film is arranged between the fingerprint recognition module and the transparent cover plate.

10. The display panel according to claim 1, wherein the optical film is arranged at a side of the transparent cover plate away from the fingerprint recognition module.

11. The display panel according to claim 1, further comprising a protection layer at a side of the transparent cover plate away from the fingerprint recognition module; and the optical film is arranged between the fingerprint recognition module and the protection layer.

12. The display panel according to claim 11, wherein the fingerprint recognition module comprises a capacitor type fingerprint recognition sensor.

13. The display panel according to claim 12, further comprising a semiconductor film between the transparent cover plate and the protection layer, wherein semiconductor stripes spaced apart from each other are formed on the semiconductor film.

14. The display panel according to claim 13, wherein the optical film is between the transparent cover plate and the semiconductor film.

15. The display panel according to claim 13, wherein the optical film is between the protection layer and the semiconductor film.

16. The display panel according to claim 1, wherein the optical film is an optically variable film.

17. The display panel according to claim 16, wherein the optically variable film comprises at least one layer of high refractivity film and at least one layer of low refractivity film arranged alternately.

18. The display panel according to claim 1, further comprising:
   a touch screen between the fingerprint recognition module and the display assembly.

19. The display panel according to claim 1, wherein the display panel is a frameless display panel.

20. A display device comprising: the display panel according to claim 1.

* * * * *